(12) United States Patent
Lee et al.

(10) Patent No.: US 9,280,241 B2
(45) Date of Patent: Mar. 8, 2016

(54) TOUCH PANEL AND METHOD FOR MANUFACTURING

(71) Applicant: TPK Touch Solutions (Xiamen) Inc., Xiamen (CN)

(72) Inventors: Yuh-Wen Lee, Zhubei (TW); Keming Ruan, Ningde (CN); Fengming Lin, Fuzhou (CN)

(*) Notice: Subject to any disclaimer, the term of this patent is extended or adjusted under 35 U.S.C. 154(b) by 209 days.

(21) Appl. No.: 13/831,913

(22) Filed: Mar. 15, 2013

(65) Prior Publication Data
US 2014/0267945 A1    Sep. 18, 2014

(30) Foreign Application Priority Data
Mar. 15, 2012   (CN) .......................... 2012 1 0068105

(51) Int. Cl.
G06F 3/045    (2006.01)
G06F 3/044    (2006.01)
G06F 3/0354   (2013.01)

(52) U.S. Cl.
CPC ............ G06F 3/044 (2013.01); G06F 3/03547 (2013.01); *G06F 2203/04103* (2013.01)

(58) Field of Classification Search
CPC ..... G06F 3/041; G06F 3/045; G06F 3/03547; G06F 3/0412; G06F 3/0414; G06F 3/046; G06F 3/047; G06F 2203/041; G06F 3/044; G06F 2203/04107; G06F 2203/04111; G06F 2203/04112; G06F 2203/04113; G06F 2203/04103

USPC ................................................... 345/173–174
See application file for complete search history.

(56) References Cited

U.S. PATENT DOCUMENTS

| | | | |
|---|---|---|---|
| 8,179,380 B2 * | 5/2012 | Ellis ............................ | 345/174 |
| 2004/0252109 A1 * | 12/2004 | Trent et al. ................... | 345/174 |
| 2006/0152497 A1 * | 7/2006 | Rekimoto ..................... | 345/173 |
| 2007/0057167 A1 * | 3/2007 | MacKey et al. ............... | 250/221 |
| 2010/0007626 A1 * | 1/2010 | Lai .............................. | 345/174 |
| 2010/0277433 A1 | 11/2010 | Lee et al. | |
| 2011/0031041 A1 * | 2/2011 | Bulea et al. ................. | 178/18.06 |

FOREIGN PATENT DOCUMENTS

| | | |
|---|---|---|
| CN | 102096489 | 6/2011 |
| KR | 2009114505 | 11/2009 |
| TW | 262427 | 9/2004 |
| TW | 368848 | 11/2009 |

* cited by examiner

*Primary Examiner* — Lun-Yi Lao
*Assistant Examiner* — Jarurat Suteerawongsa

(57) ABSTRACT

The present disclosure relates to a touch panel, and more particularly, to a touch panel having no or a reduced number of frames. The touch panel includes a substrate, a plurality of first electrodes, and second electrodes, wherein the first electrodes and the second electrodes are disposed on two opposite sides of the substrate, respectively. The first electrodes extend along an initial direction from initial positions and divert from the initial direction to terminate in first termination positions. The second electrodes extend from second initial positions and terminate in second termination positions along a second direction.

19 Claims, 9 Drawing Sheets

TOUCH PANEL AND METHOD FOR MANUFACTURING

This application claims the benefit of Chinese application No. 201210068105.1, filed on Mar. 15, 2012.

BACKGROUND

1. Technical Field

The present disclosure relates to a touch panel, and more particularly relates to a touch panel with less number of frames.

2. Description of the Related Art

In the current information era, people are increasingly dependent an electronic devices. Electronic devices such as tablet computers, mobile phones, and digital cameras, etc., have become indispensable appliances in modern life and work of people. Most of the foregoing electronic devices have touch screens that provide users with a quicker and simpler control interface. Most of the electronic devices have touch panels on touch screens, which allow a user to directly input an operating information through the touch panel present on the touch screen of the electronic device so that the purpose of manipulating the electronic device can be attained.

FIG. 1 illustrates a schematic diagram of a touch panel 50. The touch panel 50 includes a plurality of first electrodes 51, a plurality of second electrodes 52, a plurality of conductive lines 53, and four frames 54A, 54B, 54C and 54D. The touch panel 50 is designed as having a display area 55 and a peripheral area 56 surrounding the display area 55. The first electrodes 51 and the second electrodes 52 respectively extend along the horizontal direction and the vertical direction in the display area 55 of the touch panel 50. When a user contacts the touch panel 50, touch position can be determined on the touch panel 50 by detecting the changes of electronic signals of the first electrode 51 and the second electrode 52. The conductive lines 53 are disposed on the periphery area 56 of the touch panel and electronically connected to the first electrodes 51 and the second electrodes 52. Most of the conductive lines 53 are made of metallic substances. The frames 54A, 54B, 54C and 54D are applied at the periphery area 56 to shield and decorate the touch panel 50 and does not expose the conductive lines 53 on the surface of the touch panel, thereby reaching the perfection of the touch panel appearance. However, the display area 55 of the touch panel 50 is correspondingly diminished due to the frames 54A, 54B, 54C and 54D.

SUMMARY OF THE INVENTION

The present disclosure provides a touch panel without a frame or with reduced number of frames by altering the design of electrodes in the touch panel.

The present disclosure provides a touch panel comprising: a substrate, a plurality of first electrodes, and a plurality of second electrodes. The substrate has a first side and a second side opposite to the first side. The first electrodes are disposed on the first side of the substrate, wherein the first electrodes respectively extend along a first initial direction from a plurality of first initial positions and divert from the first initial direction to terminate in a plurality of first termination positions. A plurality of second electrodes are disposed on the second side of the substrate and extend along a second initial direction from a plurality of second initial positions to terminate in a plurality of second termination positions.

The present disclosure further provides a manufacturing method for a touch panel comprising the steps of: forming conductive films respectively on a first side of a substrate and a second side opposite to the first side of the substrate; patterning the conductive film on the first side and the second side of the substrate respectively to form a plurality of first electrodes and second electrodes; extending the first electrodes respectively along a first initial direction from a plurality of first initial positions and diverting them from the first initial direction to terminate in a plurality of first termination positions; extending the second electrodes respectively along a second initial direction from a plurality of second initial positions to terminate in a plurality of second termination positions.

By the design of the first electrodes and the second electrodes of the present disclosure coupled with the shape of the substrate, the touch panel having no frame or reduced number of frames can be produced. Thus, the display area of the touch panel can be enlarged without increasing the overall dimension of the touch panel.

BRIEF DESCRIPTION OF THE DRAWINGS

For those skilled in the art, numerous embodiments and drawings described below are for illustration purpose only, and not to limit the scope of the present disclosure in any manner.

DETAILED DESCRIPTION OF THE EMBODIMENTS

Certain words and phrases used in the following description and claims refer to specific components. The same components in the pertained area are comprehensible for ordinary learners and possibly referred to with different terms possibly used by the manufacturers. The description and claims of the present disclosure do not take such difference in used terms as a way of distinguishing components, but take the difference in component functions as the benchmark of distinction. The term [include] mentioned in the description and claims is an open term and therefore should be interpreted as [include but not be limited to]. Moreover, in order to make the ordinary technicians familiar with the technical field of the present disclosure, the following text particularly lists several favorable embodiments of the present disclosure and illustrates the constituent contents of the present disclosure in detail. It is to be understood that the schemas are made only for the purpose of illustration, and not drawn in accordance with the original dimensions. In addition, use of terms such as "the first" and "the second" in the description and claims are only used for differentiating different components but not to restrict their generation sequence.

Figure 1:
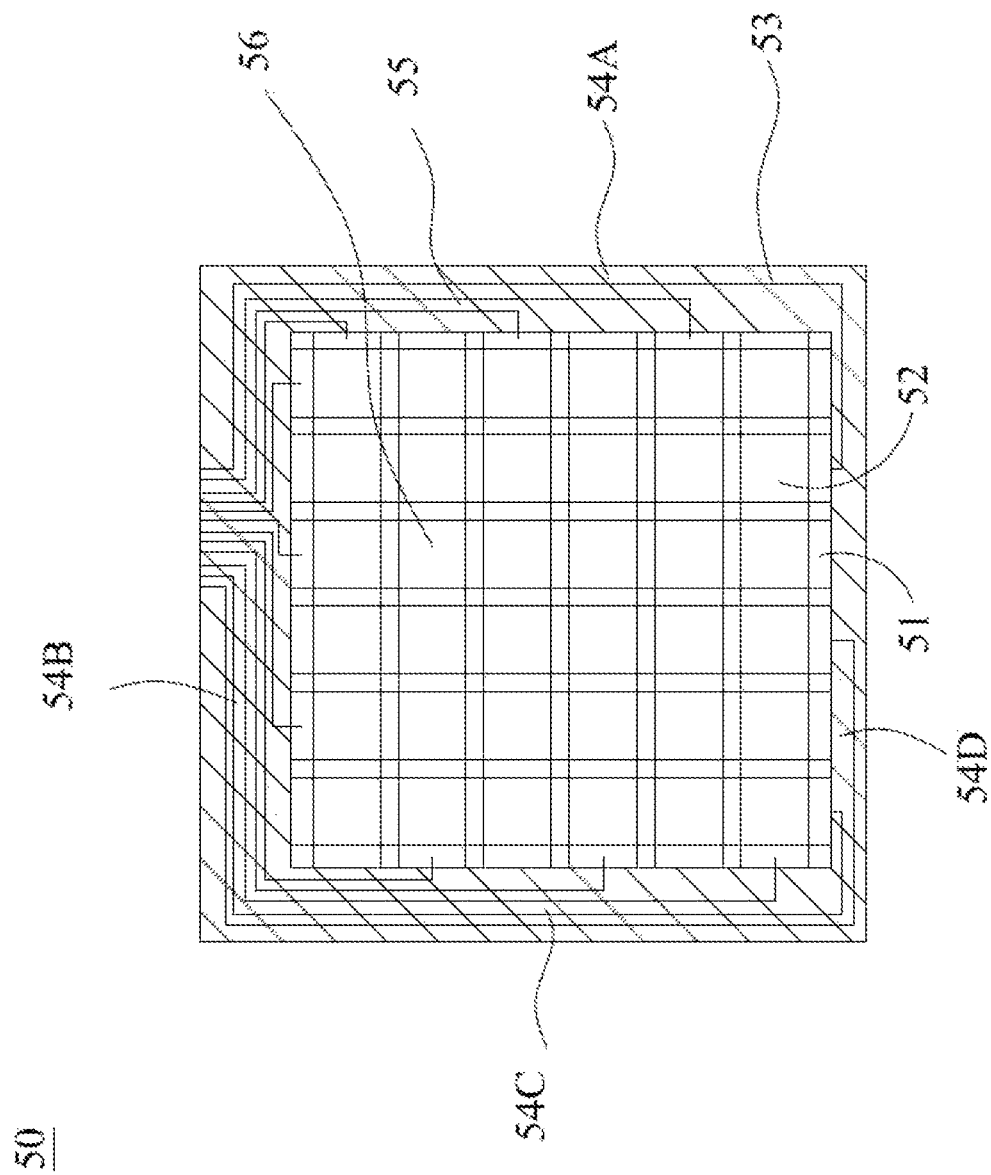
FIG. 1 is a schematic diagram of a touch panel in having existing technology.
Figure 2:
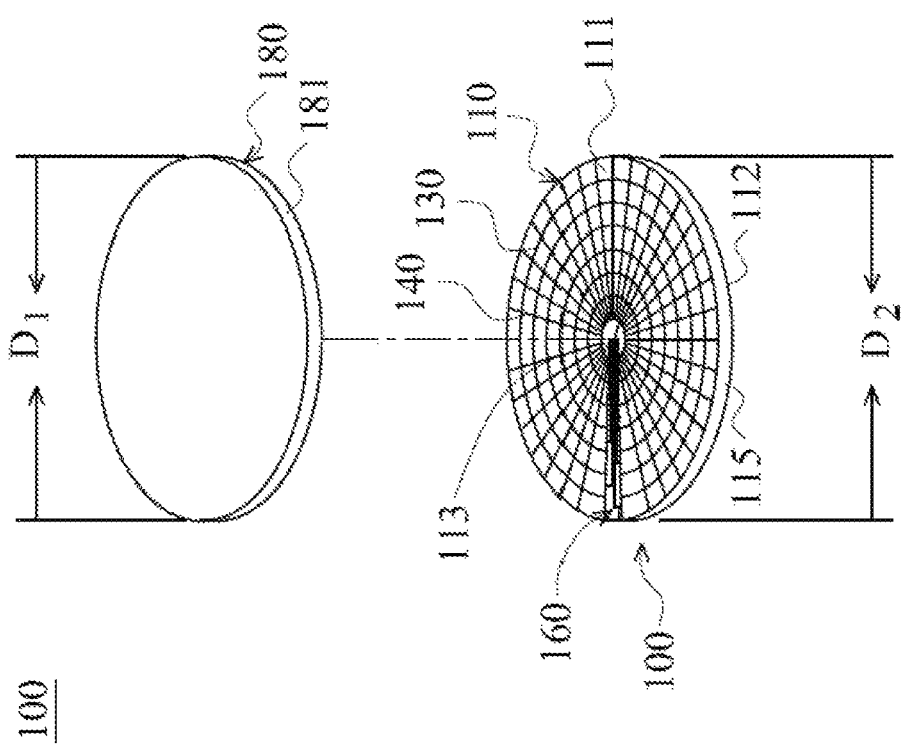
FIG. 2 is an exploded view of components in a touch panel in accordance with a first embodiment of the present disclosure.

With reference to FIG. 2, FIG. 2 is an exploded view of components in a touch panel 100 in accordance with the first embodiment of the present disclosure. As shown in FIG. 2, the touch panel 100 includes a substrate 110, a plurality of first electrodes 130, and a plurality of second electrodes 140, wherein the substrate 110 has a first side 111, on which the plurality of first electrodes 130 are disposed, and a second side 112 opposite to the first side 111, on which the plurality of second electrodes 140 are disposed.

The touch panel 100 further includes a transparent sheet material 180, which is disposed on the outermost side of the touch panel 100 and covers the substrate 110 for providing a touch plane and protecting the electrodes on the surface of the substrate 110. The transparent sheet material 180 has a circular structure with a first diameter D1. In the embodiment, the transparent sheet material 180 is a transparent reinforced glass. Furthermore, the transparent sheet material 180 includes an outside lateral 181. In a specific embodiment, the substrate 110 and the transparent sheet material 180 can be bonded mutually via a double faced adhesive tape (not shown), but the same is not limited herein. The substrate 110 can be a circular structure with a second diameter D2, an inside lateral 113, and an outside lateral 115, while the outside lateral 181 of the transparent sheet material 180 can be aligned to the outside lateral 115 of the substrate 110. An opening 160 is formed between the inside lateral 113 of the substrate 110 and the outside lateral 115 of the substrate 110, which is a confined area not having distributed electrodes on the surface of the substrate 110.

The touch panel 100 further includes a plurality of first conductive lines 150 (referring to FIG. 3) and a plurality of second conductive lines 151 (referring to FIG. 4), which are used for inputting touch signals to a control system (not shown). The plurality of first conductive lines 150 are located in the opening 160 and are respectively connected to the plurality of first electrodes 130, whereas the plurality of second conductive lines 151 are located in the area surrounded by the inside lateral 113 of the substrate 110 and connected to the plurality of second electrodes 140 in distribution.

Figure 3:
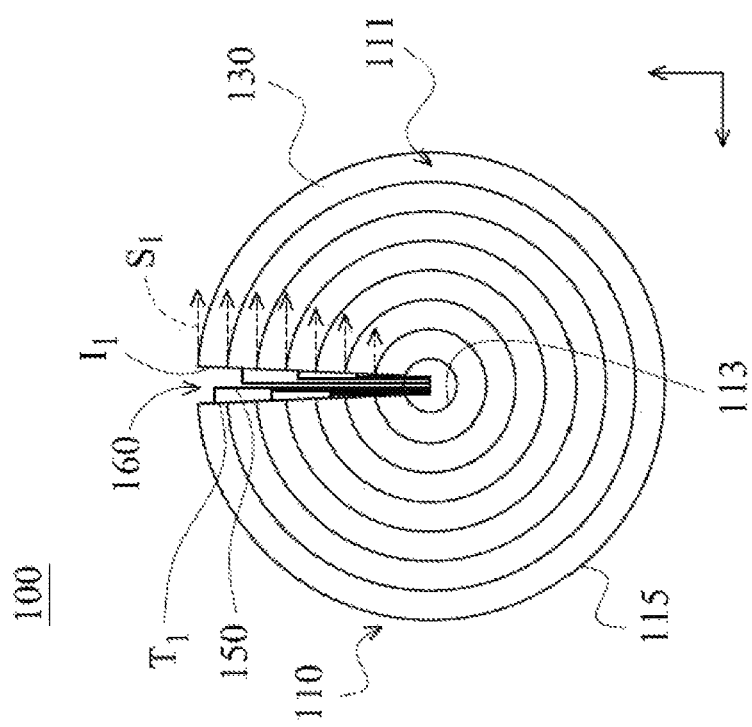
FIG. 3 is a top-view of the touch panel in accordance with the first embodiment of the present disclosure.

With reference to FIG. 3, FIG. 3 is a top view of the touch panel 100 in accordance with the first embodiment of the present disclosure. For easy illustration, FIG. 3 shows the substrate 110, the first electrodes 130 and the first conductive lines 150 connected to the first electrodes 130. In a specific embodiment, each of the first electrodes 130 extends along the first initial direction S1 from the first initial positions I1. In this embodiment, after extending from the first initial positions I1, the first electrodes 130 divert from the first initial direction S1 and respectively extend to the first termination positions T1 located on another side of the opening 160. The first initial positions I1 and the first termination positions T1 are respectively located on two opposite sides of the opening 160. The first conductive lines 150 connected to the first electrodes 130 are located in the opening 160 and respectively correspond to the first initial position I1 and the first termination position T1. In another embodiment without drawings, the first conductive lines 150 are connected to the first electrodes 130 by respectively corresponding to a first initial position I1, or the first conductive lines 150 are connected to the first electrodes 130 by respectively corresponding to a first termination position T1.

It is to be noted that the first electrodes 130 in the embodiment do not mutually overlap. In other words, the first electrodes 130 extend from the first initial position I1 to the first termination position T1 by taking the essence center of the substrate 110 as the center of the circle such that the first electrodes 130 are formed with several concentric-circle patterns.

Figure 4:
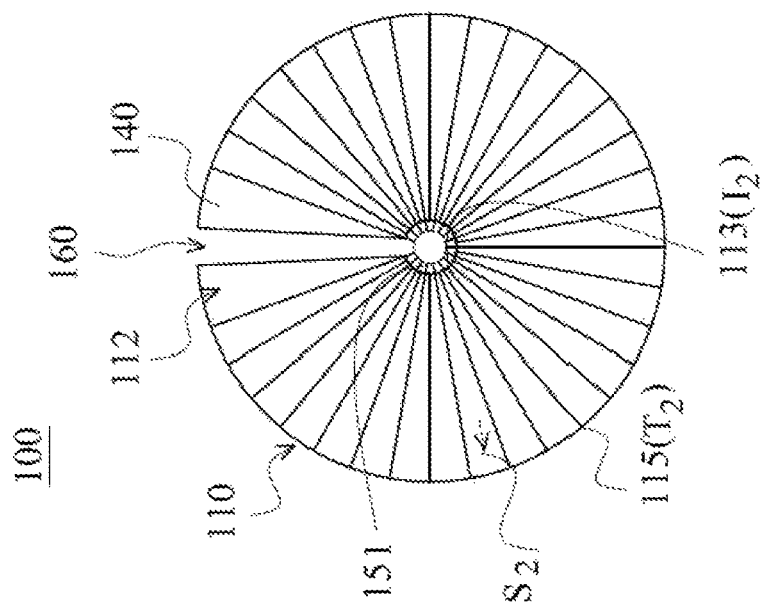
FIG. 4 is a bottom-view of the touch panel in accordance with the first embodiment of the present disclosure.

With reference to FIG. 4, FIG. 4 is a bottom view of the touch panel 100 in accordance with the first embodiment of the present disclosure. For easy illustration, FIG. 4 displays only the substrate 110, the second electrodes 140, and the second conductive lines 151 connected to the second electrodes 140. In a specific embodiment, the second electrodes 140 extend along the second initial direction S2 from the second initial positions I2 to terminate in the second termination positions T2. The second initial positions I2 are located on the inside lateral 113 of the substrate 110 while the second termination positions T2 are located on the outside lateral 115 of the substrate 110. In the embodiment, the second conductive lines 151 are placed in the area surrounded by the inside lateral 113 of the substrate 110 and connected to the second electrodes 140 by corresponding to the second initial positions I2.

Figure 6:
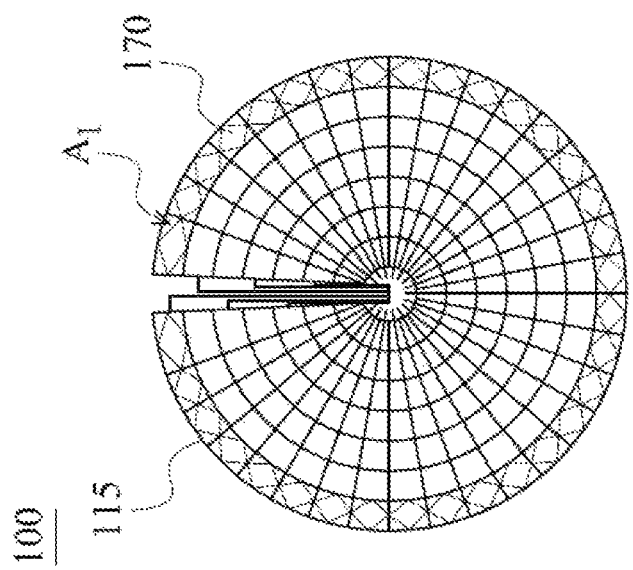
FIG. 6 is a schematic diagram of a touch panel in accordance with a second embodiment of the present disclosure.
Figure 5:
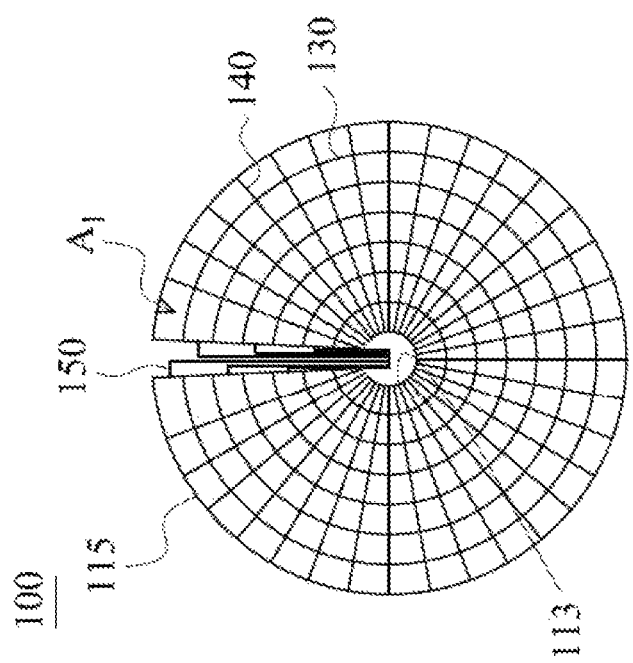
FIG. 5 is a schematic diagram of the touch panel in accordance with the first embodiment of the present disclosure.

With reference to FIG. 5, FIG. 5 defines several detection areas A1 formed by the first electrodes 130 and the second electrodes 140. A control system can make more analysis on touch positions by analyzing the changes in capacitance values in each detection area A1. However, as shown in FIG. 5, within the detection area A1, area adjacent to the outside lateral 115 of the substrate 110 is larger than the area adjacent to the inside lateral 113 of the substrate 110, which causes the detection area A1 adjacent to the outside lateral 115 of the substrate 110 to have relatively inferior sensitivity. To improve the situation and enhance the sensitivity of touch detection on the outside lateral 115 of the substrate 110, in a second embodiment of the present disclosure, a plurality of auxiliary electrodes 170 can be added to the detection area A1 adjacent to the outside lateral 115 of the substrate 110, as shown in FIG. 6.

Figure 7:
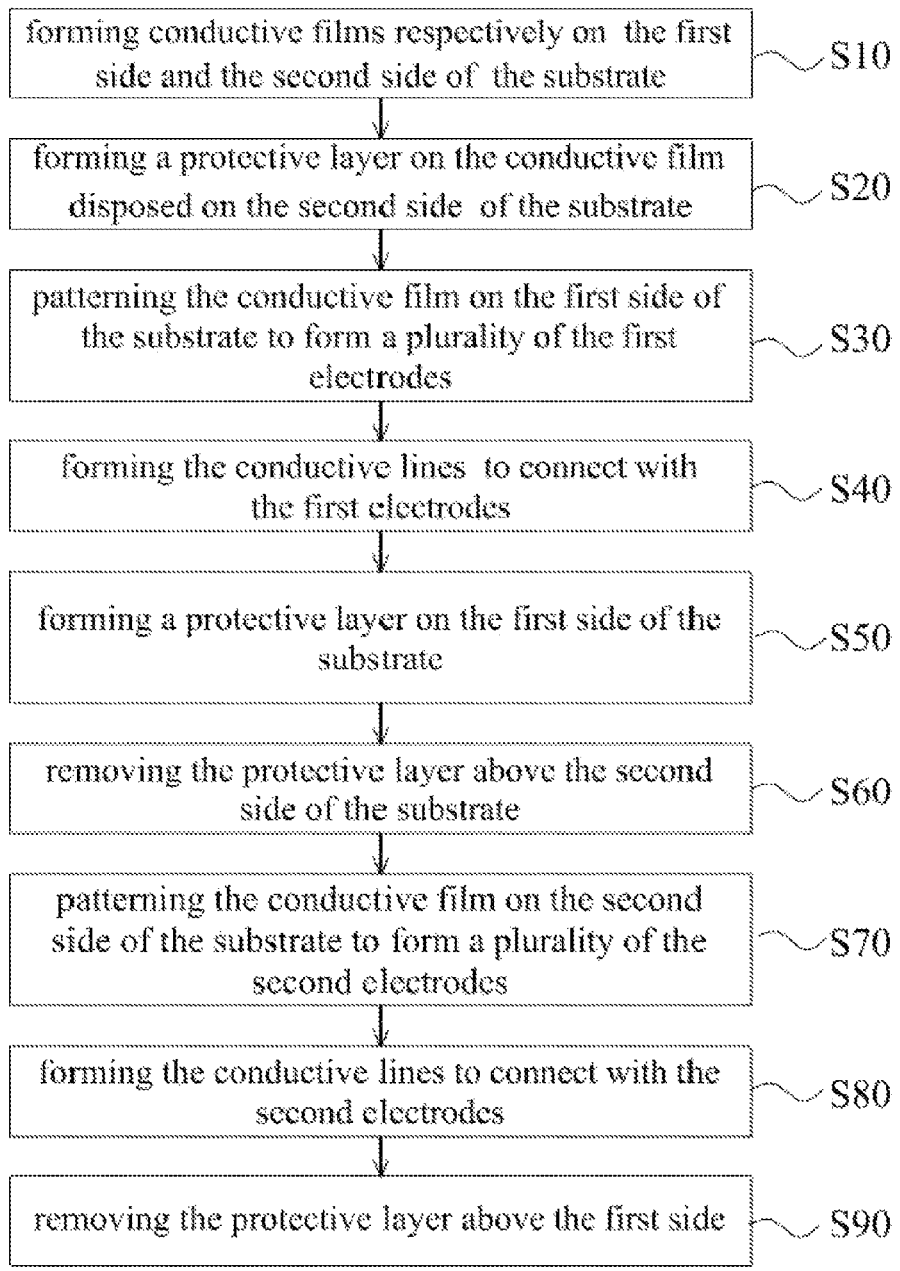
FIG. 7 is a flow chart of manufacturing method of the touch panel in accordance with the first embodiment of the present disclosure.

A manufacturing method of a touch panel 100 of the present disclosure includes: forming conductive films respectively on a first side 111 of a substrate 110 and on a second side 112 opposite to the first side; patterning the conductive films on the first side 111 and the second side 112 of the substrate respectively to form a plurality of first electrodes 130 and second electrodes 140 respectively. With reference to FIG. 7 coupled with FIG. 2, FIG. 7 shows a flow chart of manufacturing method of the touch panel 100 in accordance with the first embodiment of the present disclosure. As shown in FIG. 7, the manufacturing method of the touch panel 100 includes: forming conductive films (such as Indium tin oxide, ITO) respectively on the first side 111 and the second side 112 of a substrate 110 (S10); forming a protective layer on the conductive film disposed on the second side 112 of the substrate 110 (S20); patterning the conducive film on the first side 111 of the substrate 110 to form the first electrodes 130 (S30), wherein every first electrode 130 extends by surrounding the essence center of the substrate 110; forming the conductive lines 150 to connect with the first electrodes 130 (S40); forming a protective layer on the first side 111 of the substrate 110 (S50); removing the protective layer above the second side 112 (S60); patterning the conductive film on the second side 112 of the substrate 110 to form the second electrodes 140 (S70); forming the conductive lines 151 to connect with the second electrodes 140 (S80); and removing the protective layer above the first side 111 (S90).

Referring to FIG. 2 again, since the first conductive lines 150 connected to the first electrodes 130 are set in the opening 160, and the second conductive lines 151 connected to the second electrodes 140 are set in an area surrounded by the inside lateral 113 of the substrate 110, the frame used for shielding the conductive lines 150 and 151 is not necessary to be disposed on the front surface of the touch panel 100. In other words, the front surface of the touch panel 100 of this embodiment is the transparent sheet material 180 so as to make an outside lateral 181 of the transparent sheet material 180 aligned to the outside lateral 115 of the substrate 110, that is to say, the first diameter D1 of the transparent sheet material 180 equals to the second diameter D2 of the substrate 110. Therefore, a touch panel 100 without frame can be finished. The display area of the touch panel 100 can, as a result, be efficiently increased as the frame is no longer required. The shape of the substrate 110 and the patterns of the first electrode 130 and the second electrode 140 are explicitly disclosed in the embodiment regarding the structure of the touch panel 100, and therefore are not repeated again for brevity.

Figure 8:
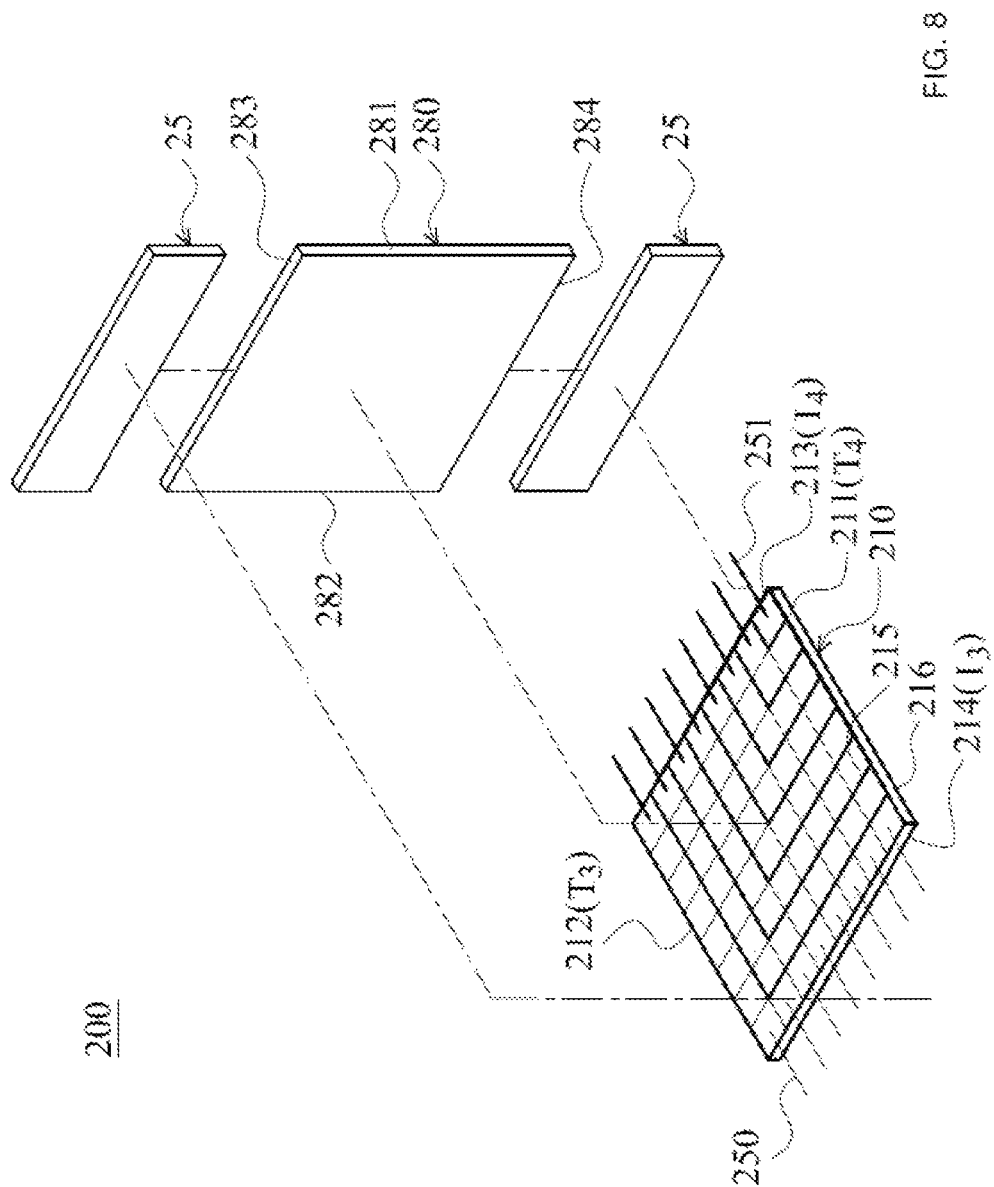
FIG. 8 is an exploded view of components in the touch panel in accordance with a third embodiment of the present disclosure.

With reference to FIG. 8, FIG. 8 is an exploded view of components in a touch panel 200 in accordance with the third embodiment of the present disclosure. As shown in FIG. 8, the touch panel 200 includes a substrate 210, a plurality of first electrodes 230, and second electrodes 240. The substrate 210 has a first side 215 on which a plurality of first electrodes 230 are disposed, and a second side 216 opposite to the first side, on which a plurality of second electrodes 240 are disposed.

Figure 9:
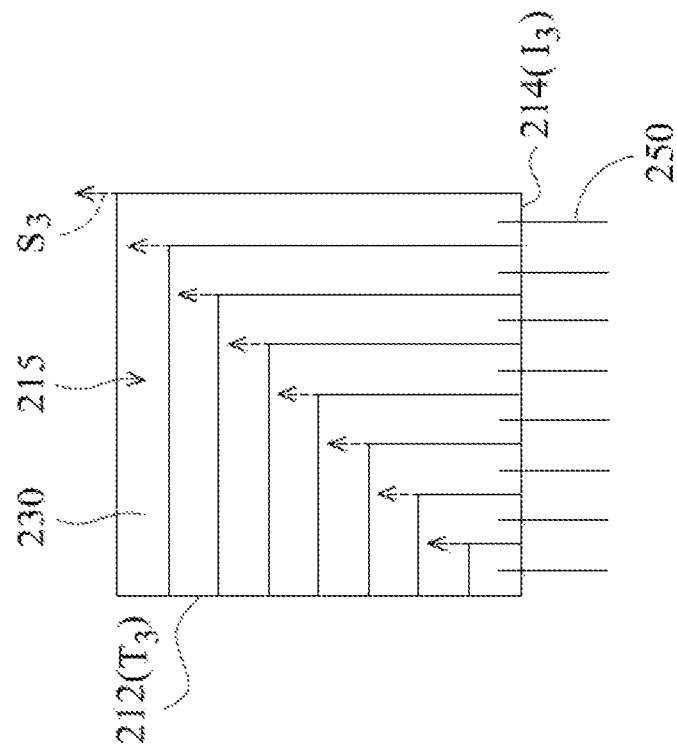
FIG. 9 is a top view of the touch panel in accordance with the third embodiment of the present disclosure.

The touch panel 200 further includes a transparent sheet material 280 disposed on an outermost side of the touch panel 200 and covering the substrate 210, which is used for providing touch plane and protecting the electrodes on the surface of the substrate 210. The transparent sheet material 280 is a transparent reinforced glass in rectangular shape, wherein the substrate 210 and the transparent sheet material 280 can be bonded via a double faced adhesive tape (not shown). The transparent sheet material 280 includes a first outside lateral 281, a second outside lateral 282, a third outside lateral 283, and a fourth outside lateral 284, wherein the first outside lateral 281 is opposite to the second outside lateral 282, while the third outside lateral 283 and the fourth outside lateral 284 are opposite to each other and connected in the space between the first outside lateral 281 and the second outside lateral 282. The substrate 210 can have a rectangular structure with a first outside lateral 211, a second outside lateral 212, a third outside lateral 213, and a fourth outside lateral 214. The first outside lateral 211 of the substrate 210 can be aligned to the first outside lateral 281 of the transparent sheet material 210, while the second outside lateral 212 of the substrate 210 can be aligned to the second outside lateral 282 of the transparent sheet material 210. The third outside lateral 213 and the fourth outside lateral 214 of the substrate 210 can be opposite to each other and connected in space between the first outside lateral 211 and the second outside lateral 212. FIG. 9 illustrates a top view of the touch panel 200 in accordance with the third embodiment of the present disclosure. For easy illustration, FIG. 9 displays only the substrate 210, the first electrodes 230, and a plurality of first conductive lines 250 connected to the first electrodes 230. In a specific embodiment, the first electrodes 230 extend with unequal lengths along a first initial direction S3 from the first initial positions I3. Next, the first electrodes 230 divert from the first initial direction S3 and extend along the vertical direction to the first initial direction S3 to terminate in the first termination positions T3.

Figure 10:
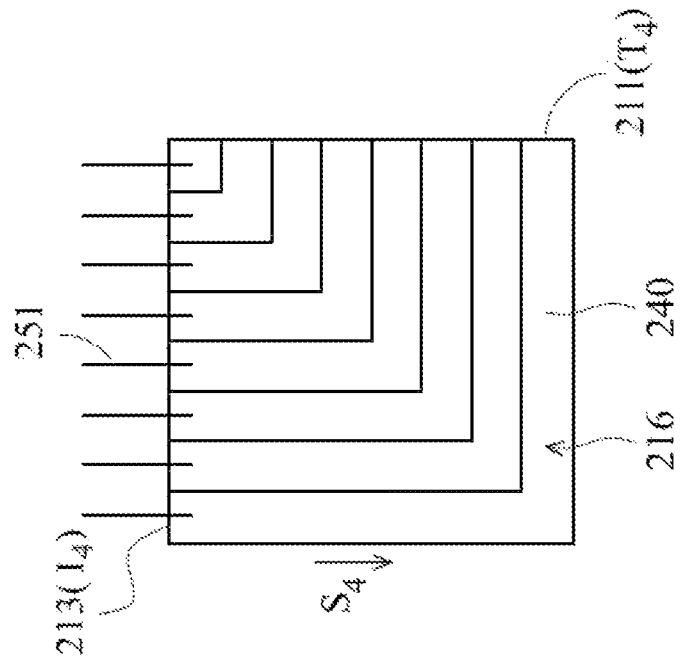
FIG. 10 is a bottom view of the touch panel in accordance with the third embodiment of the present disclosure.

With reference to FIG. 10, FIG. 10 illustrates a bottom view of the touch panel 200 in accordance with the second embodiment of the present disclosure. For easy illustration, FIG. 10 displays only the substrate 210, the second electrodes 240, and a plurality of second conductive lines 251 connected to the second electrodes 240. In a specific embodiment, the second electrodes 240 extend from a plurality of second initial positions I4 along a second initial direction S4 opposite to the first initial direction S3, and divert from the vertical direction to the second initial direction S4 to terminate in the second termination positions T4|[A1].

Figure 11:
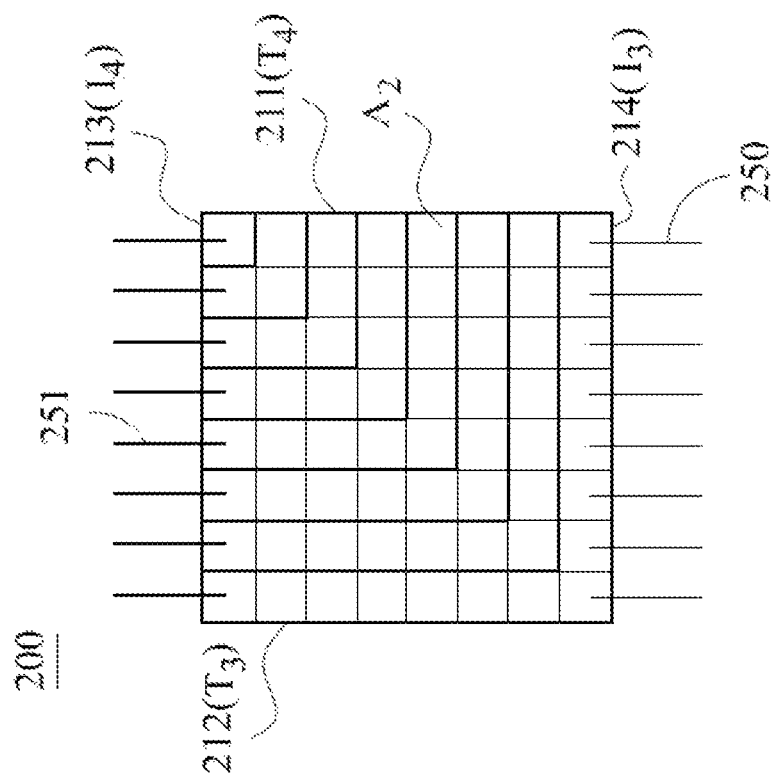
FIG. 11 is a schematic diagram of a touch panel in accordance with the third embodiment of the present disclosure.

Referring to FIG. 11, several detection area A2 are defined in the area formed by the first electrodes 230 and the second electrodes 240. A control system can make more analysis on touch positions by analyzing the changes of capacitance values in each detection area A2. In an overall view, the foregoing first initial positions I3 are located on the fourth outside lateral 214 of the substrate 210; the first termination positions T3 are located on the second outside lateral 212 of the substrate 210; the second initial positions I4 are located on the third outside lateral 213 of the substrate 210; and the second termination positions T4 are located on the first outside lateral 211 of the substrate 210. The first conductive lines 250, corresponding to the first initial positions I3, are connected to the first electrodes 230, while the second conductive lines 251, corresponding to the second initial positions I4, are connected to the second electrodes 240, but the scope of the present disclosure is not limited to this arrangement and/or configuration. In another embodiment without schema, the first conductive lines 250, corresponding to the first initial position I3, are connected to the first electrodes 230, while the second conductive lines 251, corresponding to the second initial position I4, are connected to the second electrodes 240.

Figure 12:
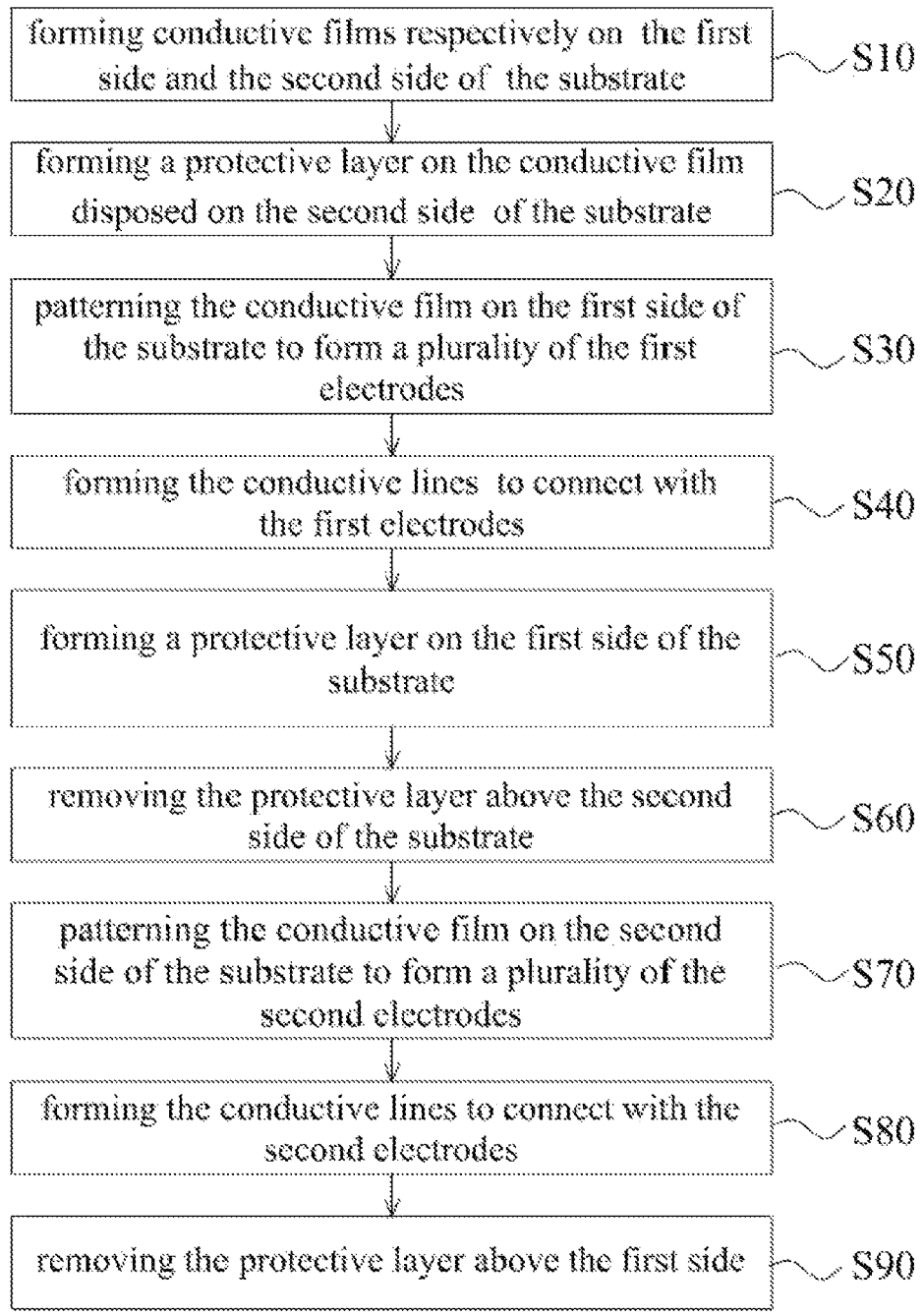
FIG. 12 is a flow chart of manufacturing method of the touch panel in accordance with the third embodiment of the present disclosure.

A manufacturing method of a touch panel 200 of the present disclosure includes: forming conductive films respectively on a first side 215 of a substrate 210 and on a second side 216 opposite to the first side; patterning the conductive films on the first side 215 and the second side 216 of the substrate 210 respectively to form a plurality of first electrodes 230 and second electrodes 240 respectively. With reference to FIG. 12 coupled with FIG. 8, FIG. 12 shows a flow chart of manufacturing method of the touch panel 200 in accordance with the third embodiment of the present disclosure. As shown in FIG. 12, the manufacturing method of the touch panel 200 includes: forming conductive films (such as ITO) respectively on the first side 215 and the second side 216 of a substrate 210 (S10); forming a protective layer on the conductive film dispose on the second side 216 of the substrate 210 (S20); patterning the conducive film on the first side 215 of the substrate 210 to form the first electrodes 230 (S30), as shown in FIG. 9, the first electrodes 230 extend with unequal lengths along the first initial direction S3 from the first initial positions I3, Next, the first electrodes 230 divert from the first initial direction S3 and extend along the vertical direction to the first initial direction S3 to terminate in the first termination positions T3; forming the conductive lines 250 to connect with the first electrodes 230 (S40); forming a protective layer on the first side 215 of the substrate 210 (S50); removing the protective layer above the second side 216 (S60); patterning the conductive film an the second side 216 of the substrate 210 to form the second electrodes 140 (S70); as shown in FIG. 10, the second electrodes 240 extend from a plurality of second initial positions I4 along the second initial direction S4 opposite to the first initial direction S3, and divert from the vertical direction to the second initial direction S4 to terminate in the second termination positions T4; forming the conductive lines 251 to connect with the second electrodes 240 (S80); and removing the protective layer above the first side 215 (S90).

Referring to FIG. 8 again, it is to be noted that the foregoing first initial positions I3 and the second initial positions I4 are respectively located on two opposite sides of the substrate 210; the first termination positions T3 and the second termination positions T4 are respectively located on two opposite sides of the substrate 210. To shield the first conductive lines 250 connected to the first electrodes 230 and the second conductive lines 251 connected to the second electrodes 240, only two frames 25 are respectively configured corresponding to the positions I3 and I4 where the conductive lines 250 and 251 are set and connected to the third outside lateral 283 and the fourth outside lateral 284 of the transparent sheet material 280, and cover the first conductive lines 250 and the second conductive lines 251. On the other hand, there is no additional frames corresponding to the first termination position T3 and the second termination positions T4 needed to be used for shielding because the first termination positions T3 and the second termination positions T4 are not connected to the conductive lines. Therefore, the first outside lateral 211 of the substrate 210 is aligned to the first outside lateral 281 of the transparent sheet material 280, and the second outside lateral 212 of the substrate 210 is aligned to the second outside lateral 282 of the transparent sheet material 280. Thus, a touch panel 200 with only two frames can be finished. It is also to be noted that in the practical manufacturing process, the frames 25 and the transparent sheet materials 280 usually have an integration-molded structure. The transparent sheet materials 280 extend towards the area where the first conductive lines 250 and the second conductive lines 251 are located. A black photoresist layer or a black ink layer can be coated beneath the extension part of the transparent sheet material 280 to shape the frames 25 for shielding conductive lines and perfecting the appearance of the touch panel.

Due to the design of electrode arrangement on two opposite sides of the substrate in the present disclosure, absence of or the reduction of frames in the touch panel of the present disclosure can be realized. Thus, the display area of the touch panel can be enlarged without increasing the overall dimension of the touch panel.

While certain embodiments have been shown and described, various modifications and substitutions may be made thereto without departing from the spirit and scope of the disclosure. Therefore, it is to be understood that the present disclosure has been described by way of illustration and not limitations.

What is claimed is:

1. A touch panel comprising: a substrate having a first side and a second side opposite to the first side; a plurality of first electrodes disposed on the first side of the substrate and a plurality of second electrodes disposed on the second side of the substrate; wherein an inside lateral and an outside lateral of the substrate together defines a touch area; and wherein an opening without the first electrodes and the second electrodes distributed thereon is formed in the touch area, and a plurality of first initial positions and a plurality of first termination positions are located on two opposite sides of the opening; wherein the first electrodes extend along a first initial direction from the plurality of first initial positions, and divert from the first initial direction to terminate in the plurality of first termination positions; wherein the first electrodes extend from the first initial position to the first termination position by taking the essence center of the substrate as the center of the circle such that the first electrodes are formed with a plurality of concentric-circle patterns; and the plurality of second electrodes extending along a second initial direction from a plurality of second initial positions to terminate in a plurality of second termination positions; wherein the second initial positions are located on the inside lateral of the substrate, and the second termination positions are located on the outside lateral of the substrate; and wherein the second electrodes extend from the second initial position to the second termination position to form a plurality of polar sector patterns.

2. The touch panel of claim 1, further comprising a transparent sheet material disposed on the substrate, and wherein the transparent sheet material has an outside lateral aligned to an outside lateral of the substrate.

3. The touch panel of claim 2, wherein the transparent sheet material has a circular structure with a first diameter, and the substrate has a circular structure with a second diameter, further wherein the first diameter equals to the second diameter.

4. The touch panel of claim 1, wherein the substrate has a circular structure.

5. The touch panel of claim 4, further comprising a plurality of first conductive lines located in the opening, wherein the first conductive lines respectively correspond to the first initial positions and/or the first termination positions and connected to the first electrodes.

6. The touch panel of claim 4, wherein the first electrodes are insulated from each other.

7. The touch panel of claim 4, wherein the second electrodes are insulated from each other.

8. The touch panel of claim 4, wherein the second electrodes are surrounded by the inside lateral and the outer lateral.

9. The touch panel of claim 1, further comprising a plurality of second conductive lines located in the area surrounded by the inside lateral of the substrate, wherein the second conductive lines correspond to the second initial positions and are connected to the second electrodes.

10. The touch panel of claim 1, further comprising a plurality of detection areas formed by the first electrodes and the second electrodes, wherein a plurality of auxiliary electrodes are set within the detection areas adjacent to the outside lateral of the substrate.

11. A manufacturing method of a touch panel, comprising: forming conductive films respectively on a first side of a substrate and a second side of the substrate opposite to the first side; patterning the conductive films on the first side and the second side of the substrate to form a plurality of first electrodes and second electrodes respectively and an opening without the first electrodes and the second electrodes distributed thereon; wherein a plurality of first initial positions and a plurality of first termination positions are located on two opposite sides of the opening; wherein the first electrodes extend along a first initial direction from a plurality of first initial positions and divert from the first initial direction to terminate in a plurality of fast termination positions, and wherein the first electrodes extend from the first initial position to the first termination position by taking the essence center of the substrate as the center of the circle such that the first electrodes are formed with several concentric-circle patterns; and wherein the second electrodes extend along a second initial direction from a plurality of second initial positions to terminate in a plurality of second termination positions; wherein the second initial positions are located on the inside lateral of the substrate, and the second termination positions are located on the outside lateral of the substrate; and wherein the second electrodes extend from the second initial position to the second termination position to form a plurality of polar sector patterns.

12. The manufacturing method of the touch panel of claim 11, wherein the step of patterning the conductive films on the first side and the second side of the substrate further comprises: forming a protective layer to cover the conductive film on the second side of the substrate; patterning the conductive film on the first side of the substrate to form the plurality of first electrodes on the first side of the substrate; forming a protective layer to cover the plurality of first electrodes on the first side of the substrate; removing the protective layer on the second side of the substrate; and patterning the conductive films on the second side of the substrate to form the plurality of second electrodes on the second side of the substrate.

13. The manufacturing method of the touch panel of claim 11, wherein the substrate has a circular structure.

14. The manufacturing method of the touch panel of claim 13, wherein the second initial positions are located on the inside lateral of the substrate, and the second termination positions are located on the outside lateral of the substrate.

15. The manufacturing method of the touch panel of claim 13, wherein the method further comprises the steps of: forming a plurality of first conductive lines located in the opening, wherein the first conductive lines respectively correspond to the first initial positions and/or the first termination positions and are connected to the first electrodes.

16. The manufacturing method of the touch panel of claim 13, wherein the method further comprises the steps of: forming a plurality of second conductive lines located in an area surrounded by the inside lateral of the substrate, wherein the second conductive lines correspond to the second initial positions and are connected to the second electrodes.

17. The touch panel of claim 11, wherein the first electrodes are insulated from each other.

18. The touch panel of claim 11, wherein the second electrodes are insulated from each other.

19. The touch panel of claim 11, wherein the second electrodes are surrounded by the inside lateral and the outer lateral.

* * * * *